(12) United States Patent
Yoshikawa et al.

(10) Patent No.: US 7,465,420 B2
(45) Date of Patent: Dec. 16, 2008

(54) FILM FORMING METHOD

(75) Inventors: Tadao Yoshikawa, Kurashiki (JP); Tatsuya Sunamoto, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 751 days.

(21) Appl. No.: 10/843,308

(22) Filed: May 12, 2004

(65) Prior Publication Data

US 2004/0232603 A1 Nov. 25, 2004

(30) Foreign Application Priority Data

May 21, 2003 (JP) .............................. 2003-143251
Mar. 31, 2004 (JP) .............................. 2004-102623

(51) Int. Cl.
*B29C 55/28* (2006.01)

(52) U.S. Cl. ..................................................... 264/564

(58) Field of Classification Search .................. 264/564
See application file for complete search history.

(56) References Cited

U.S. PATENT DOCUMENTS

| 5,534,209 | A | * | 7/1996 | Moriya | ................... | 264/171.13 |
| 5,997,765 | A | * | 12/1999 | Furuta et al. | ........... | 252/299.01 |
| 6,528,164 | B1 | | 3/2003 | Ohbe et al. | | |
| 6,656,578 | B2 | * | 12/2003 | Ohbe et al. | .................. | 428/221 |
| 2003/0088053 | A1 | | 5/2003 | Ohbe et al. | | |

FOREIGN PATENT DOCUMENTS

| JP | 2-3430 | 1/1990 |
| JP | 2000-289107 | 10/2000 |
| JP | 2001-342243 | 12/2001 |

OTHER PUBLICATIONS

U.S. Appl. No. 10/843,308, filed May 12, 2004, Yoshikawa et al.
U.S. Appl. No. 10/650,847, filed Aug. 29, 2003, Miyata et al.
U.S. Appl. No. 10/650,680, filed Aug. 29, 2003, Miyata et al.
Practical Handbook of the Plastics Industry, vol. 1/Ding Hao, Editor—Beijing: Chemical Industry Press, 1995, pp. 1288-1989 (Translation).

* cited by examiner

*Primary Examiner*—Suzanne E. McDowell
(74) *Attorney, Agent, or Firm*—Oblon, Spivak, McClelland, Maier & Neustadt, P.C.

(57) ABSTRACT

The method of manufacturing a film of thermotropic liquid crystal polymer includes extruding a thermotropic liquid crystal polymer of a kind in which any one of activation energies Ea1 and Ea2 of a melt viscosity is within the range of 30 to 90 kcal/mol, with the ratio (Ea1/Ea2) of the activation energy Ea1 relative to the activation energy Ea2 being within the range of 1 to 1.7. The activation energies Ea1 and Ea2 are measured by means of a capillary rheometer, including a nozzle of 1 mm in inner diameter and 10 mm in length disposed at an angle of introduction of 90° and a barrel of 9.55 mm in inner diameter, at respective shear rates of 243 seconds$^{-1}$ and 2432 seconds$^{-1}$ under a temperature ranging from the temperature [(Tm−10)° C.], which is lower by 10° C. than the melting point [(Tm)° C.] of the thermotropic liquid crystal polymer, to the temperature [(Tm+20)° C.], which is higher by 20° C. than the melting point [(Tm)° C.] of the thermotropic liquid crystal polymer. The thermotropic liquid crystal polymer also has a melt viscosity of not lower than 400 poises measured under predetermined conditions, and is extruded from a die that is heated to a temperature of predetermined range.

5 Claims, No Drawings

FILM FORMING METHOD

BACKGROUND OF THE INVENTION

1. Field of the Invention

The present invention relates to a method for forming a film made of a thermoplastic polymer capable of forming an optically anisotropic melt phase (which thermoplastic polymer is hereinafter referred to as a thermotropic liquid crystal polymer) or a polymer composition containing such thermotropic liquid crystal polymer.

2. Description of the Related Art

In recent years, in the electric and electronic fields, demands for reduction in size and/or weight of electric and electronic instruments and equipments are increasing and, in the course of this, the need has arisen to make available an insulating film having a uniform film thickness and excellent electrical and mechanical properties. Although with polyimide and polyethylene terephthalate which are generally used as a material for the conventional insulating film can be effectively utilized to provide a film having a uniform film thickness, such material involves a problem in that not only is the electrical property insufficient in a high frequency region, but also the electrical property tends to be deteriorated and change in dimension tends to occur because of a particularly high moisture absorbability. Accordingly, with such material, the film satisfying the above discussed demands is considered unable to manufacture.

In contrast thereto, in view of the fact that the thermotropic liquid crystal polymer has an excellent electrical property and a low dimensional change ratio and also has high heat resistance and chemical stability, the thermotropic liquid crystal polymer is considered useful in the electric and electronic fields. As a method of simply manufacturing a film made of the thermotropic liquid crystal polymer, the film forming method utilizing the inflation molding technique is suggested in the Japanese Laid-open Patent Publication No. 2-3430.

However, with the conventional film forming method, when the thermotropic liquid crystal polymer in a molten state is to be extruded from an inflation molding machine, the melt viscosity thereof tends to abruptly decrease by the effect of a shear stress developed in the die, rendering the film to be difficult to retain its shape. Also, the melt viscosity of the extruded thermotropic liquid crystal polymer abruptly increased during cooling that takes place subsequent to extrusion through the die and, therefore, the anisotropy of physical properties of the film in longitudinal and lateral directions, which is brought about by the molecular orientation, is difficult to improve. Moreover, it is difficult to suppress variation in thickness of the film and variation in anisotropy in physical property of the film, both resulting from a slight difference in melt viscosity. Those difficulties make it difficult to simply and stably manufacture the film having a minimized anisotropy, that is, having a property as isotropic as possible, with uniform film thickness and anisotropy.

SUMMARY OF THE INVENTION

In view of the foregoing, the present invention has for its primary object to provide an improved, industrially useful method of simply and stably manufacturing a film made of a thermotropic liquid crystal polymer by means of an inflation molding technique, which film has a minimized anisotropy, with a uniform film thickness and also a uniform film anisotropy.

In order to accomplish the foregoing object of the present invention, manufacture of the film is carried out by means of an inflation molding technique. Specifically, a thermoplastic polymer capable of forming an optically anisotropic melt phase (hereinafter referred to as a thermotropic liquid crystal polymer) is extruded from a die that is heated to a temperature adjusted to satisfy $0 \leq Tm - Td \leq 50$, wherein $Td$ represents the temperature (° C.) of the die and $Tm$ represents the melting point (° C.) of the thermotropic liquid crystal polymer.

The thermotropic liquid crystal polymer referred to above is of a kind in which any one of activation energies $Ea1$ and $Ea2$ of a melt viscosity is within the range of 30 to 90 kcal/mol, with the ratio ($Ea1/Ea2$) of the activation energy $Ea1$ relative to the activation energy $Ea2$ being within the range of 1 to 1.7. The activation energies referred to above are measured by means of a capillary rheometer, including a nozzle of 1 mm in inner diameter and 10 mm in length disposed at an angle of introduction of 90° and a barrel of 9.55 mm in inner diameter, at respective shear rates of 243 seconds$^{-1}$ and 2432 seconds$^{-1}$ (the activation energy measured at the shear rate of 243 seconds$^{-1}$ being referred to as $Ea1$ while the activation energy measured at the shear rate of 2,432 seconds$^{-1}$ is referred to as $Ea2$) under a temperature ranging from the temperature [$(Tm-10)$° C.], which is lower by 10° C. than the melting point [$(Tm)$° C.] of the thermotropic liquid crystal polymer, to the temperature [$(Tm+20)$° C.], which is higher by 20° C. than the melting point [$(Tm)$° C.] of the thermotropic liquid crystal polymer.

The thermotropic liquid crystal polymer also has a melt viscosity, which, when measured at the shear rate of 2,432 seconds$^{-1}$ under a temperature ranging from the temperature [$(Tm)$° C.], which is the melting point of the thermotropic liquid crystal polymer, to the temperature [$(Tm+10)$° C.], which is higher by 10° C. than the melting point [$(Tm)$° C.] of the thermotropic liquid crystal polymer, is equal to or higher than 400 poises.

According to the present invention, since the use is made of the thermotropic liquid crystal polymer of melt viscosity property, that is, the behavior of the melt viscosity satisfies the above described specific conditions (the melt viscosity and the activation energies thereof) and since such thermotropic liquid crystal polymer is extruded from the die having a temperature adjusted to a specific value as described above, the film having a minimized anisotropy can be simply manufactured with minimized variation in film thickness and, also, in anisotropy. Also, since the elongation of the resultant film is proper, an undesirable breakage of the film occurs hardly during the manufacture of the film and, thus, the film can be manufactured in a stable fashion.

As a result of extensive studies conducted by the inventors of the present invention based on those findings, it has been found that even with a polymer composition containing the thermotropic liquid crystal polymer of which behavior of the melt viscosity satisfies the above discussed specific conditions, the film having a minimized anisotropy can be simply manufactured with minimized variation in film thickness and, also, in anisotropy, when such polymer composition is extruded from the die set to a specific temperature as discussed above and inflation molded.

As a result of further extensive studies conducted by the inventors of the present invention, provided that the melt viscosity property as a whole, that is behavior of the melt viscosity of the polymer composition containing the thermotropic liquid crystal polymer can satisfy conditions (the melt viscosity and the activation energies thereof) similar to those described above, inflation molding thereof through the die set to the specific temperature as discussed above can make it possible to manufacture the film having a minimized anisotropy with minimized variation in film thickness and, also, in anisotropy. Thus, the present invention is based o those findings.

DETAILED DESCRIPTION OF THE EMBODIMENTS

Specific examples of thermotropic liquid crystal polymers that can be employed in the practice of the present invention include, although not specifically limited thereto, well-known thermotropic liquid crystal polyester and thermotropic liquid crystal polyester amide prepared from such compounds as classified under (1) to (4) below, and their derivatives.

(1) Aromatic or aliphatic dihydroxy compounds, representative examples of which are shown in Table 1 below.

TABLE 1

Chemical formulas of the representative examples of aromatic or aliphatic dihydroxy compounds (X: hydrogen atom or halogen atom, or lower alky, phenyl or like groups)

(Y: —O—, —$CH_2$—, —S— or like groups)

HO($CH_2$)nOH (n: an integer from 2 to 12)

(2) Aromatic or aliphatic dicarboxylic acids, representative examples of which are shown in Table 2 below.

TABLE 2

Chemical formulas of the representative examples of aromatic or aliphatic dicarboxylic acids TABLE 2-continued Chemical formulas of the representative examples of aromatic or aliphatic dicarboxylic acids HOOC($CH_2$)nCOOH (n: an integer from 2 to 12)

(3) Aromatic hydroxycarboxylic acids, representative examples of which are shown in Table 3 below.

TABLE 3

Chemical formulas of the representative examples of aromatic hydroxycarboxylic acids (X: hydrogen atom or halogen atom, or lower alky, phenyl or like groups)

(4) Aromatic diaries, aromatic hydroxyamines and aromatic aminocarboxylic acids, representative examples of which are shown in Table 4 below.

TABLE 4

Chemical formulas of representative examples aromatic diamines, aromatic hydroxyamines and aromatic aminocarboxylic acids

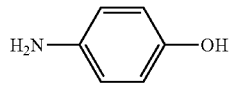

TABLE 4-continued

Chemical formulas of representative examples aromatic diamines, aromatic hydroxyamines and aromatic aminocarboxylic acids

Representative examples of the thermotropic liquid crystal polymers prepared from any of those starting material compounds include copolymers having such structural units as indicated in Table 5 below.

TABLE 5

Structural units of the representative examples of thermotropic liquid crystal polymers

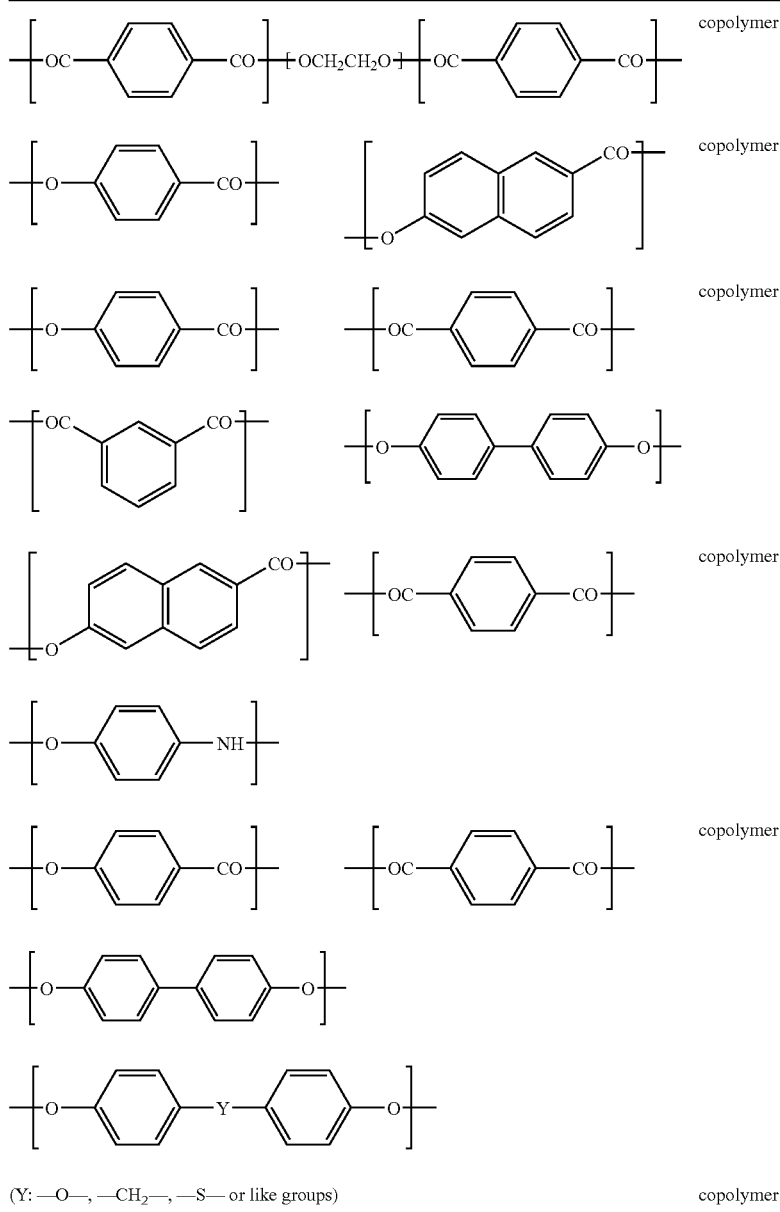

(Y: —O—, —$CH_2$—, —S— or like groups)

Those thermotropic liquid crystal polymers have a transition temperature to an optically anisotropic melt phase, preferably within the range of about 200 to about 400° C. and, more preferably, within the range of about 250 to about 350° C., so that the resulting film can have a desirable heat resistance property and workability.

In the practice of the present invention, the thermotropic liquid crystal polymer may employ one or two or more of the various compounds. Where two or more compounds are employed for the thermotropic liquid crystal polymer, they can be satisfactorily employed if the behavior of the melt viscosity as a whole can satisfy the previously discussed requirements. In such case, it may occur that measurement of the melting point of the thermotropic liquid crystal polymer in accordance with the measuring method (the differential scanning calorimetry) as will be described later in connection with Examples will result in observation of a plurality of peak temperatures appearing in the endothermic curve, but for the purpose of the present invention, the highest of those peak temperatures appearing in the endothermic curve is defined as the melting point [(Tm)° C.] of the thermotropic liquid crystal polymer.

The thermotropic liquid crystal polymer employed in the practice of the present invention may be in the form of a polymer composition mixed with a thermoplastic resin other than the thermotropic liquid crystal polymer, which thermoplastic resin may include, for example, polyarylate, polyphenylene sulfide, polyphenylene ether, polyether ether ketone, polyamide, polyamide-imide, polyimide, or an olefin copolymer containing an epoxy group, provided that it will not adversely affect the physical property of the eventually formed film. Such thermotropic resin is currently available in the market and may be such as tradenamed "U-Polymer" (polyarylate; available from Unitika Ltd. of Japan); "Fortron" (polyphenylene sulfide; available from Polyplastics Co., Ltd. of Japan); "Noryl" (polyphenylene ether; available from Japan GE Plastics Co., Ltd.); "Sumiploy-K" (polyether ether ketone; available from Sumitomo Chemical Co., Ltd. of Japan); "ARLEN" (polyamide; available from Mitsui Chemical Co., Ltd. of Japan); "TORLON" (polyamide imide; available from AMOCO Engineering Polymers Co., Ltd. of Japan); and "BONDFAST" (olefin copolymer containing an epoxy group; available from Sumitomo Chemical Co., Ltd. of Japan).

The amount of the thermoplastic resin to be mixed in the polymer composition is not higher than 50 parts by weight, preferably not higher than 30 parts by weight, relative to 100 parts by weight of the thermotropic liquid crystal polymer, although the specific amount thereof varies depending on the kind of thermoplastic resin to be actually used.

Any of the thermotropic liquid crystal polymer and the polymer composition containing the thermotropic liquid crystal polymer and the thermoplastic resin may, if desired or required, contain one or more of such additives as lubricant, antioxidant, filler and other additives. The term "polymer composition" referred to above and hereinafter is intended to encompass the thermotropic liquid crystal polymer or the polymer composition containing the thermotropic liquid crystal polymer and the thermoplastic resin, which are added with one or more additives referred to above.

In addition to the inflation molding under a special condition of the thermotropic liquid crystal polymer of a kind having specific melt viscosity properties (the melt viscosity and the activation energy thereof), the present invention is also intended to encompass the inflation molding under a special condition of the polymer composition containing the thermotropic liquid crystal polymer having the specific melt viscosity properties and, also, the inflation molding under a special condition of the polymer composition containing the thermotropic liquid crystal polymer and having the specific melt viscosity properties as will be described later.

When it comes to the use of the polymer composition containing the thermotropic liquid crystal polymer, the polymer composition is preferably of a kind in which the behavior of the melt viscosity is similar to that of the thermotropic liquid crystal polymer.

More specifically, the polymer composition that can be employed in the practice of the present invention is of a kind in which any one of the activation energies $Ea1c$ and $Ea2c$ of the melt viscosity of the polymer composition, as defined below, is preferably within the range of 30 to 90 kcal/mol, with the ratio of the activation energy $Ea1c$ relative to the activation energy $Ea2c$ (i.e., $Ea1c/Ea2c$) being within the range of 1 to 1.7. The activation energies $Ea1c$ and $Ea2c$ referred to above are measured by the use of a capillary rheometer, including a nozzle of 1 mm in inner diameter and 10 mm in length disposed at an angle of introduction of 90° and a barrel of 9.55 mm in inner diameter, at respective shear rates of 243 seconds$^{-1}$ (for $Ea1c$) and 2432 seconds$^{-1}$ (for $Ea2c$) under a temperature ranging from the temperature [(Tmc−10)° C.], which is lower by 10° C. than the melting point [(Tmc)° C.] of the polymer composition, to the temperature [(Tmc+20)° C], which is higher by 20° C. than the melting point [(Tmc)° C.] of the polymer composition.

Concurrently therewith, the polymer composition referred to above has a melt viscosity preferably not lower than 400 poises when measured under the shear rate of 2432 seconds$^{-1}$ at a temperature ranging from the melting point [(Tmc)° C.] of the polymer composition to the temperature [(Tmc+10)° C.] which is higher by 10° C. than such melting point.

It is to be noted that although the melting point [(Tmc)° C.] of the polymer composition is defined in terms of the peak temperature appearing in the endothermic curve measured in accordance with such method (the differential scanning calorimetry) as discussed in the subsequently described, non-limiting Examples of the present invention, the highest temperature is chosen therefore where the measured endothermic curve contains a number of peak temperatures.

The term "thermotropic liquid crystal polymer" used in the description of the present invention that follows encompasses the polymer composition referred to above, except for that in Examples 1 to 4. Also, in the description of the present invention that follows, the melting point of the thermotropic liquid crystal polymer is designated by Tm and the activation energies of such thermotropic liquid crystal polymer are designated by $Ea1$ and $Ea2$, whereas the melting point of the polymer composition is designated by Tmc and the activation energies of such polymer composition are designated by $Ea1c$ and $Ea2c$.

The thermotropic liquid crystal polymer employed in the practice of the present invention is preferably of a kind in which the activation energies $Ea1$ and $Ea2$ of the melt viscosity thereof must be within the range of 30 to 90 kcal/mol, when measured by the use of a capillary rheometer, including a nozzle of 1 mm in inner diameter and 10 mm in length disposed at an angle of introduction of 90° and a barrel of 9.55 mm in inner diameter, at respective shear rates of 243 seconds$^{-1}$ (for $Ea1$) and 2432 seconds$^{-1}$ (for $Ea2$) under a temperature ranging from the temperature [(Tm−10)° C.], which is lower by 10° C. than the melting point [(Tm)° C.] of the thermotropic liquid crystal polymer, to the temperature [(Tm+20)° C.], which is higher by 20° C. than the melting point [(Tm)° C.] of the thermotropic liquid crystal polymer. The activation energies $Ea1$ and $Ea2$ are a parameter indicative of the temperature dependency of the melt viscosity and are each more preferably within the range of 40 to 80 kcal/mol. At the same time, the ratio of the activation energy Ea1 relative to the activation energy Ea2 (i.e., Ea1/Ea2) must be within the range of 1 to 1.7, preferably within the range of 1 to 1.5.

Also, the thermotropic liquid crystal polymer employed in the present invention has a melt viscosity (Mv) which must be equal to or higher than 400 poises, preferably higher than 500 poises, when measured under the shear rate of 2432 seconds$^{-1}$ at a temperature ranging from the melting point [(Tm)° C.] of the thermotropic liquid crystal polymer to the temperature [(Tm+10)° C.] which is higher by 10° C. than such melting point.

If either of the activation energies Ea1 and Ea2 is higher than 90 kcal/mol, the melt viscosity of the thermotropic liquid crystal polymer abruptly increases as it is cooled subsequent to extrusion in a molten state from the die, to such an extent as to result in incapability of being drawn uniformly and, accordingly, the film having a minimized anisotropy cannot be obtained with variation in both film thickness and anisotropy being minimized. On the other hand, if either of the activation energies Ea1 and Ea2 is lower than 30 kcal/mol, the melt viscosity of the thermotropic liquid crystal polymer as extruded in a molten state from the die increases a little to such an extent that the extruded thermotropic liquid polymer is unable to retain a desired shape and, accordingly the film having a uniform film thickness with no wrinkle formed therein cannot be manufactured.

Also, if the ratio Ea1/Ea2 departs from the range of 1 to 1.7, the melt viscosity of the thermotropic liquid crystal polymer tends to be adversely affected by change in temperature, change in amount of discharge and change in dimension of the die and, therefore, no stable inflation molding can be accomplished. In addition, if the melt viscosity MV is lower than 400 poises, the melt viscosity of the thermotropic liquid crystal polymer extruded in a molten state from the die tends to decrease and, therefore, it may occur that the extruded thermotropic liquid crystal polymer cannot retain the desired shape.

The activation energy of the melt viscosity of the thermotropic liquid crystal polymer at each of the shear rates of 243 seconds$^{-1}$ and 2432 seconds$^{-1}$ can be determined from the Arrhenius plot by the utilization of the melt viscosity that is measured at two, preferably three, different temperatures selected from the temperature range from the temperature [(Tm−10)° C.], which is lower by 10° C. than the melting point [(Tm)° C.] of the thermotropic liquid crystal polymer, to the temperature [(Tm+20)° C.], which is higher by 20° C. than the melting point [(Tm)° C.] of the thermotropic liquid crystal polymer. Specifically, the gradient of the rectilinear line depicted by plotting natural logarithms of the melt viscosity against the reciprocal of the measurement temperature (absolute temperature), at which the measurement is carried out, represents the activation energy of the melt viscosity and, where the number of the measurement temperature is equal to or greater than three, the gradient of the rectilinear line can be calculated by means of the least squares.

The thermotropic liquid crystal polymer of a kind with the melt viscosity property (the melt viscosity and the activation energies thereof) satisfying the above described specific conditions can be obtained by suitably adjusting composition of a raw material, degree of polymerization, and condition of reaction during the manufacture of the polymer.

Since the thermotropic liquid crystal polymer tends to be highly oriented during the melt extrusion molding, there is a propensity in which the anisotropy in mechanical and thermal properties of the film, which would be eventually formed as a result of the extrusion molding, tends to increase. In other words, when the thermotropic liquid crystal polymer in a molten state is extrusion-molded through a T-die, the shear stress or the tensile force acts only in a direction (hereinafter referred to as a MD direction) conforming to the direction of extrusion and, therefore, a uniaxially oriented film can be obtained. This uniaxially oriented film, although having a high tensile modulus and a high mechanical strength in the MD direction, has a low tensile modulus and a low mechanical strength in a direction (hereinafter referred to as a TD direction) orthogonal to the MD direction. Therefore, not only is the uniaxially oriented film susceptible to generation of cut lines in the MD direction, but also the dimensional change ratio differs between the MD direction and the TD direction, resulting in a problem that the film tends to warp easily.

In order to improve the anisotropy in both mechanical property and thermal property, the present invention utilizes an inflation molding technique in performing the melt extrusion molding of the thermotropic liquid crystal polymer. In the practice of the inflation molding, stresses are applied not only in the MD direction of the film, but also in the TD direction thereof and, accordingly, a biaxially oriented film can be obtained, in which the mechanical and thermal properties in the MD direction and those in the TD direction can advantageously balanced with each other and the cut lines will hardly occur in the MD direction.

In the practice of the inflation molding of the thermotropic liquid crystal polymer, it is necessary for the thermotropic liquid crystal polymer in a molten state to be extruded while the difference (Tm−Td) in temperature between the melting point [(Tm)° C.] of the thermotropic liquid crystal polymer and the temperature [(Td)° C.] of the die is adjusted to a value within the range of 0 to 50° C., preferably within the range of 10 to 50° C. and more preferably within the range of 10 to 40° C.

If the temperature difference (Tm−Td) between the melting point [(Tm)° C.] of the thermotropic liquid crystal polymer and the temperature [(Td)° C.] of the die is larger than 50° C., the melt viscosity of the thermotropic liquid crystal polymer discharged from the die is too high to achieve a uniform drawing and, therefore, no film having a minimized anisotropy can be obtained without variation in both film thickness and anisotropy minimized. On the other hand, if the temperature difference (Tm−Td) takes a negative value, the melt viscosity of the thermotropic liquid crystal polymer discharged from the die is too low for the extruded thermotropic liquid crystal polymer to retain a desired shape and, therefore, no film free from wrinkles and having a uniform film thickness can be manufactured. Although the temperature Td of the die at this time is the lowest temperature of an inner wall surface of the die, direct measurement of such temperature of the inner wall surface of the die is difficult to achieve and, therefore, the lowest preset temperature for the die can instead be employed.

In the practice of the inflation molding of the thermotropic liquid crystal polymer in accordance with the present invention, the blow ratio is preferably within the range of 1.5 to 10 and more preferably within the range of 2 to 8. On the other hand, the draft ratio is preferably within the range of 1.5 to 20 and more preferably within the range of 1.5 to 10. The blow ratio referred to above is descriptive of the drawing ratio in the TD direction whereas the draft ratio referred to above is descriptive of the drawing ratio in the MD direction. If the blow ratio and the draft ratio are out of the respective ranges discussed above, the shape of the thermotropic liquid crystal polymer discharged from the die will be instable before being cooled to solidify and it would be difficult to manufacture the film having a uniform film thickness and having no wrinkle and, therefore, the blow ratio and the draft ratio should be kept within the respective range discussed above. Also, if the draft ratio is larger than 20, the draw in the MD direction will be too large, accompanied by increase of the anisotropy of the resultant film and, therefore, the draft ratio should be 20 or smaller.

Since the inflation molding performed in accordance with the present invention is effective to achieve a stable film forming and to provide the film having a uniform film thickness and having no wrinkle, it is preferred for the thermotropic liquid crystal polymer in a molten state to be extruder at a shear rate of 200 to 5,000 (1/second) as measured at the exit of the die.

The film manufactured in accordance with the present invention has a film thickness preferably not greater than 500 μm and more preferably within the range of 10 to 250 μm.

According to the present invention, the film can be obtained of a kind in which both of the tensile strength (T1) in a direction (MD direction) parallel to the direction of extrusion and the tensile strength (T2) in a direction (TD direction) orthogonal to the direction of extrusion are not lower than 70 MPa. The tensile strength in each of the directions parallel and orthogonal to the direction of extrusion can be made not lower than 100 MPa in a more preferable case.

With the film forming method according to the present invention, the film in which the ratio (T1/T2) of the tensile strength T1 relative to the tensile strength T2 is equal to or smaller than 2.5 can be obtained. The ratio (T1/T2) of the tensile strength T1 relative to the tensile strength T2 is preferably equal to or smaller than 2. If the ratio (T1/T2) of the tensile strength T1 relative to the tensile strength T2 is greater than 2.5, the film manufactured will not have a minimized anisotropy.

With the film forming method according to the present invention, the film can be obtained, in which both of the elongation (E1) in a direction (MD direction) parallel to the direction of extrusion and the elongation (E2) in a direction (TD direction) orthogonal to the direction of extrusion are equal to or larger than 7%. The elongation of the film in each of the directions parallel and orthogonal to the direction of extrusion can be, in a more preferable case, made equal to or larger than 10%.

Also, with the film forming method according to the present invention, the film can be obtained, in which the ratio (E1/E2) of the elongation E1 relative to the elongation E2 is equal to or smaller than 2.5 can be obtained. The ratio (E1/E2) of the elongation E1 relative to the elongation E2 is preferably equal to or smaller than 2. If the ratio (E1/E2) is greater than 2.5, the film manufactured will not have a minimized anisotropy.

The film obtained by the inflation molding performed in accordance with the present invention, which satisfies the foregoing conditions, is excellent in mechanical property and is robust against tear and breakage during winding of the extrusion-molded film onto a take-up roll or during processing of such film for various purposes. Accordingly, with the film forming method according to the present invention, the film forming capability and the workability can be enhanced advantageously.

Again, with the film forming method according to the present invention, the film having a segment orientation ratio of 1.5 or smaller, preferably 1.3 or smaller and more preferably 1.03 or smaller can be easily manufactured.

The segment orientation ratio, SOR, referred to above stands for an index that brings about the degree of molecular orientation of a segment composed of molecules and is quite different from the conventional MOR (molecular orientation ratio) in that the segment orientation ratio represents a value in which the thickness of an object is taken into consideration. This segment orientation ratio can be calculated in the following manner.

Using a commercially available microwave molecular orientation degree measuring apparatus including a microwave resonance waveguide, a thermotropic liquid crystal polymer film is inserted into the microwave resonance waveguide so that the film surface thereof lies perpendicular to the propagation direction of the microwaves, and the intensity of the electric field of the microwaves transmitted through the film (i.e., the microwave permeability) is measured. Based on this measurement, the m value (hereinafter referred to as a "refractive index") is calculated by the following equation:

$$m = (Z_o/\Delta z) \times [1 - \nu_{max}/\nu_o]$$

;wherein $Z_o$ represents a device constant; $\Delta z$ represents the average thickness of an object subjected to the measurement; $\nu_{max}$ represents the frequency at which the maximum microwave permeability can be obtained when the frequency of the microwave is varied; and $\nu_o$ represents the frequency at which the maximum microwave permeability can be obtained when the average thickness is zero, that is, when no object is present.

Then, the segment orientation ratio, SOR, is calculated by dividing $m_0$ by $m_{90}$ (i.e., SOR=$m_0/m_{90}$), wherein $m_0$ represents the m value attained when the angle of rotation of the object relative to the direction of oscillation of the microwaves is 0°, that is, when the direction of oscillation of the microwaves is aligned with the direction in which molecules of the object are most oriented and the minimum microwave permeability is exhibited, and $m_{90}$ represents the m value attained when the angle of rotation of the object relative to the direction of oscillation of the microwaves is 90°.

Hereinafter, the present invention will be demonstrated by way of specific examples which are not intended to limit the scope of the present invention, but are shown only for the purpose of illustration.

It is to be noted that in all of those specific examples, the melting point and the melt viscosity of each of the thermotropic liquid crystal polymer and the polymer composition containing the thermotropic liquid crystal polymer, and the tensile strength, the elongation, SOR and the film thickness of the resultant film so manufactured were measured in the following manner.

Melting Point:

Using a commercially available differential scanning calorimeter (manufactured by and available from Shimazu Corporation of Japan), after the material had been heated with temperature increased at a rate of 20° C. per minute until it was completely melted, the melt was rapidly cooled to 50° C. at a rate of 50° C./min and, then, the peak temperature of the endothermic curve appearing when the temperature thereof was raised again at a rate of 20° C./min was recorded as the melting point of the polymer.

Melt Viscosity and Activation Energies Thereof:

Using a commercially available capillary rheometer (manufactured by and available from Toyo Seiki Seisakusho Co., Ltd. of Japan), including a nozzle of 1 mm in inner diameter and 10 mm in length disposed at an angle of introduction of 90° and a barrel of 9.55 mm in inner diameter, measurement of the melt viscosity was carried out at respective shear rates of 243 seconds$^{-1}$ and 2432 seconds$^{-1}$ under a temperature ranging from the temperature [(Tm−10)° C.], which is lower by 10° C. than the melting point [(Tm)° C.] of the thermotropic liquid crystal, to the temperature [(Tm+20)° C.], which is higher by 20° C. than the melting point [(Tm)° C.] of the thermotropic liquid crystal polymer, so that six or four measurements could be obtained for each of the thermotropic liquid crystal polymers. Based on those measurements, the Arrhenius plot was depicted to calculate the activation energy of the melt viscosity of each of the thermotropic liquid crystal polymers.

It is however to be noted that in the case of the polymer composition containing the thermotropic liquid crystal polymer, measurement of the melt viscosity was carried out at respective shear rates of 243 seconds$^{-1}$ and 2432 seconds$^{-1}$ under a temperature ranging from the temperature [(Tmc−10)° C.], which is lower by 10° C. than the melting point [(Tmc)° C.] of the polymer composition, to the temperature [(Tmc+20)° C.], which is higher by 20° C. than the melting point [(Tmc)° C.] of the polymer composition and, based on those measurements, the activation energy of the melt viscosity of the polymer composition was calculated.

Film Tensile Strength and Elongation:

Ten samples, 1 cm in width and 15 cm in length, of the film manufactured according to the present invention were prepared by cutting the film into ten equal pieces in a transverse direction. Then, using a tensile testing machine (Autograph, manufactured by and available from Shimazu Corporation of Japan), each sample was tested as to the tensile strength and the elongation at room temperatures, with chuck-to-chuck distance of 10 cm, under a pulling speed of 10 mm/min according to the method stipulated in ASTM D882. The arithmetic average (xm) of the ten measurements was adopted as the tensile strength and the elongation of the film manufactured according to the present invention. Using the standard deviation (σ) and the arithmetic average (xm) of the ten resultant measurements in the following equation, the relative deviation of the tensile strength and the elongation were determined.

(σ/xm)×100(%)

Film SOR:

Ten samples, 10 cm in width and 10 cm in length, of the film manufactured according to the present invention were prepared by cutting the film into ten equal pieces in a transverse direction. Then, using a microwave molecular orientation measurement apparatus (MOA-2001A, manufactured by and available from KS Systems Co., Ltd., of Japan), the SOR of each of the samples was measured. The arithmetic average (xm) of the ten measurements was used as the SOR of the film manufactured according to the present invention. Also, based on the standard deviation (σ) and the arithmetic average (xm) of the ten measurements, the relative deviation of the SOR was calculated in a manner similar to that with the tensile strength and the elongation.

Film Thickness:

Using a digital thickness meter (tradenamed "LVDT", manufactured by and available from Mitsutoyo Corporation), the resulting film was measured at intervals of 1 cm in the transverse direction. The arithmetic average (xm) of the resultant measurements was used as the film thickness. Also, based on the standard deviation (σ) and the arithmetic average (xm) of the resultant measurements, the relative deviation of the film thickness was calculated in a manner similar to that with the tensile strength and the elongation.

EXAMPLE 1

A thermotropic liquid crystal polymer composed of p-hydroxybenzoic acid and 6-hydroxy-2-naphthoic acid and having a melting point, a melt viscosity and an activation energy of the melt viscosity as shown in Table 6 was melted in a single axis extruder having a cylinder set to a temperature of 300° C., and the resultant melt was extruded upwardly at a shear rate of 900 seconds$^{-1}$ from an annular die of 40 mm in diameter and 0.5 mm in slit interval so that the extruded melt could be expanded so as to satisfy such blow ratio (B1) and draft ratio (Dr) as shown in Table 7. After the extruded melt had been so expanded and subsequently cooled, it was drawn through a nipping roll assembly to provide the thermotropic liquid crystal polymer film of 50 μm in film thickness. The temperature to which the die was set during this inflation molding and physical properties of the resultant thermotropic liquid crystal polymer film are shown in Table 7.

EXAMPLE 2

A thermotropic liquid crystal polymer composed of p-hydroxybenzoic acid, 6-hydroxy-2-naphthoic acid, telephthalic acid, biphenol and p-aminophenol and having a melting point, a melt viscosity and an activation energy of the melt viscosity as shown in Table 6 was melted in a single axis extruder having a cylinder set to a temperature of 350° C., and the resultant melt was extruded upwardly at a shear rate of 2,000 seconds$^{-1}$ from an annular die of 40 mm in diameter and 0.25 mm in slit interval so that the extruded melt could be expanded so as to satisfy such blow ratio (B1) and draft ratio (Dr) as shown in Table 7. After the extruded melt had been so expanded and subsequently cooled, it was drawn through a nipping roll assembly to provide the thermotropic liquid crystal polymer film of 25 μm in film thickness. The temperature to which the die was set during this inflation molding and physical properties of the resultant thermotropic liquid crystal polymer film are shown in Table 7.

EXAMPLE 3

A thermotropic liquid crystal polymer composed of p-hydroxybenzoic acid, telephthalic acid, isophthalic acid and biphenol and having a melting point, a melt viscosity and an activation energy of the melt viscosity as shown in Table 6 was melted in a single axis extruder having a cylinder set to a temperature of 350° C., and the resultant melt was extruded upwardly at a shear rate of 800 seconds$^{-1}$ from an annular die of 40 mm in diameter and 0.5 mm in slit interval so that the extruded melt could be expanded so as to satisfy such blow ratio (B1) and draft ratio (Dr) as shown in Table 7. After the extruded melt had been so expanded and subsequently cooled, it was drawn through a nipping roll assembly to provide the thermotropic liquid crystal polymer film of 50 μm in film thickness. The temperature to which the die was set during this inflation molding and physical properties of the resultant thermotropic liquid crystal polymer film are shown in Table 7.

EXAMPLE 4

A thermotropic liquid crystal polymer composed of p-hydroxybenzoic acid, telephthalic acid, biphenol, and p-aminophenol and having a melting point, a melt viscosity and an activation energy of the melt viscosity as shown in Table 6 was melted in a single axis extruder having a cylinder set to a temperature of 300° C., and the resultant melt was extruded upwardly at a shear rate of 250 seconds$^{-1}$ from an annular die of 40 mm in diameter and 1 mm in slit interval so that the extruded melt could be expanded so as to satisfy such blow ratio (B1) and draft ratio (Dr) as shown in Table 7. After the extruded melt had been so expanded and subsequently cooled, it was drawn through a nipping roll assembly to provide the thermotropic liquid crystal polymer film of 100 μm in film thickness. The temperature to which the die was set during this inflation molding and physical properties of the resultant thermotropic liquid crystal polymer film are shown in Table 7.

EXAMPLE 5

A polymer composition prepared by mixing the thermotropic liquid crystal polymer employed in Example 1 with polyarylate (U-Polymer manufactured by and available from Unitika Ltd. of Japan) in a quantity of 5% by weight relative to the total weight of the composition, was melted in a single axis extruder having a cylinder set to a temperature of 300° C., and the resultant melt was extruded upwardly at a shear rate of 900 seconds$^{-1}$ from an annular die of 40 mm in diameter and 0.5 in slit interval so that the extruded melt could be expanded so as to satisfy such blow ratio (B1) and draft ratio (Dr) as shown in Table 7. After the extruded melt had been so expanded and subsequently cooled, it was drawn through a nipping roll assembly to provide the polymer composition film of 50 μm in film thickness. The temperature to which the die was set during this inflation molding and physical properties of the resultant polymer film are shown in Table 7. The melting point, the melt viscosity and the activation energy of the melt viscosity of the polymer composition are shown in Table 6.

According to Examples 1 to 5, the film of a minimized anisotropy, which is intended by the present invention, can be obtained by means of the inflation molding technique with variation in film thickness minimized and also with variation in anisotropy minimized.

COMPARATIVE EXAMPLE 1

A thermotropic liquid crystal polymer composed of p-hydroxybenzoic acid, telephthalic acid, biphenol and hydroquinone and having a melting point, a melt viscosity and an activation energy of the melt viscosity as shown in Table 6 was melted in a single axis extruder having a cylinder set to a temperature of 330° C., and the resultant melt was extruded upwardly at a shear rate of 350 seconds$^{-1}$ from an annular die of 40 mm in diameter and 0.5 mm in slit interval so that the extruded melt could be expanded so as to satisfy such blow ratio (B1) and draft ratio (Dr) as shown in Table 7. After the extruded melt had been so expanded and subsequently cooled, it was drawn through a nipping roll assembly to provide the thermotropic liquid crystal polymer film of 50 μm in film thickness. The temperature to which the die was set during this inflation molding and physical properties of the resultant thermotropic liquid crystal polymer film are shown in Table 7. Those film forming condition are those required to provide the film having a good appearance with no wrinkles appearing and also having the SOR that is as small as possible.

The film obtained in this Comparative Example 1 was such that the ratio (T1/T2) of the tensile strength (T1) in a direction (MD direction) parallel to the direction of extrusion relative the tensile strength (T2) in a direction (TD direction) orthogonal to the direction of extrusion exceeded 2.5 and, also, the ratio (E1/E2) of the elongation (E1) in a direction (MD direction) parallel to the direction of extrusion and the elongation (E2) in a direction (TD direction) orthogonal to the direction of extrusion exceeded 2.5, thus having a large anisotropy.

COMPARATIVE EXAMPLE 2

A thermotropic liquid crystal polymer composed of p-hydroxybenzoic acid and 6-hydroxy-2-naphthoic acid and having a melting point, a melt viscosity and an activation energy of the melt viscosity as shown in Table 6 was melted in a single axis extruder having a cylinder set to a temperature of 340° C., and the resultant melt was extruded upwardly at a shear rate of 2,000 seconds$^{-1}$ from an annular die of 40 mm in diameter and 0.5 mm in slit interval.

However, after the extrusion, it has been found that the activation energy of each of the melt viscosities, measured at the shear rates of 243 seconds$^{-1}$ and 2,432 seconds$^{-1}$ under the melting point of the thermotropic liquid crystal polymer and the temperature higher by 10° C. than the melting point of the thermotropic liquid crystal polymer, respectively, was lower than 30 kcal/mol and, also, the melt viscosity, measured at the shear rate of 2,432 seconds$^{-1}$ under the temperature higher by 5° C. than the melting point of the thermotropic liquid crystal polymer was low by 349 poises. Accordingly, the thermotropic liquid crystal polymer in this Comparative Example could not be drawn upwardly from the die in a stable fashion, failing to provide the film. In any event, the temperature to which the die was set during this inflation molding is shown in Table 7.

COMPARATIVE EXAMPLE 3

In a manner similar to Example 1 except that the temperature of the die was set to 228° C., an attempt was made to provide the thermotropic liquid crystal polymer by means of the inflation molding technique, but no uniform drawing was not performed with the inflation molding consequently unsuccessful.

COMPARATIVE EXAMPLE 4

In a manner similar to Example 1 except that the temperature of the die was set to 285° C., an attempt was made to provide the thermotropic liquid crystal polymer by means of the inflation molding technique, but the melt resin extruded from the die could not be drawn upwardly in a stable fashion, with the film forming consequently unsuccessful.

COMPARATIVE EXAMPLE 5

A thermotropic liquid crystal polymer composed of p-hydroxybenzoic acid and 6-hydroxy-2-naphthoic acid and having a melting point, a melt viscosity and an activation energy of the melt viscosity as shown in Table 6 was melted in a single axis extruder having a cylinder set to a temperature of 330° C., and the resultant melt was extruded upwardly at a shear rate of 900 seconds$^{-1}$ from an annular extruder die of 40 mm in diameter and 0.5 mm in slit interval so that the extruded melt could be expanded so as to satisfy such blow ratio (B1) and draft ratio (Dr) as shown in Table 7. After the extruded melt had been so expanded and subsequently cooled, it was drawn through a nipping roll assembly to provide the thermotropic liquid crystal polymer film of 50 μm in film thickness. The temperature to which the die was set during this inflation molding and physical properties of the resultant thermotropic liquid crystal polymer film are shown in Table 7. The film forming conditions in this Comparative Example were those required to provide the film having a good appearance with no wrinkles appearing and also having the SOR that is as small as possible.

The film so obtained in this Comparative Example was such that both of the ratio (T1/T2) and the ratio (E1/E2) were smaller than 2.5 and the SOR was also smaller than 1.5. Although the anisotropy was found small, the relative deviation of the respective physical properties was found exceeding 10%, with consequent considerable variation.

It is to be noted that the thermotropic liquid crystal polymer used in this Comparative Example corresponds to that available in the market and tradenamed "VECTRA A950" and is used as a raw resin material in the embodiments disclosed in the previously mentioned Japanese Laid-open Patent Publication No. 2-3430.

the scope of the present invention as delivered from the claims annexed hereto, to be construed as included therein.

This application is based on Japanese Patent Application No. 2003-143251, filed on May 21, 2003, and No. 2004-102623, filed on Mar. 31, 2004, the entire contents of which are hereby incorporated by reference.

What is claimed is:

1. A method for manufacturing a film by inflation molding, comprising extruding a thermoplastic polymer capable of forming an optically anisotropic melt phase (hereinafter referred to as a thermotropic liquid crystal polymer), wherein said thermotropic liquid crystal polymer having any one of activation energies Ea1 and Ea2 of a melt viscosity being within the range of 30 to 90 kcal/mol, with the ratio

TABLE 6

|  | Melt. Point (° C.) | Activation Energies of Melt Viscosity | | | Melt Viscosity | |
|---|---|---|---|---|---|---|
|  |  | Measuring Temp. (° C.) | Ea1 (kcal/mol) | Ea2 (kcal/mol) | Ea1/Ea2 | Measuring Temp. (° C.) | MV (poise) |
| Exmpl. 1 | 283 | 280, 290, 300 | 68 | 53 | 1.3 | 290 | 1307 |
| Exmpl. 2 | 340 | 340, 345, 355 | 64 | 47 | 1.4 | 345 | 937 |
| Exmpl. 3 | 335 | 330, 335, 340 | 67 | 44 | 1.5 | 335 | 516 |
| Exmpl. 4 | 280 | 290, 300 | 71 | 53 | 1.3 | 290 | 2511 |
| Exmpl. 5 | 283 | 280, 290, 300 | 67 | 45 | 1.5 | 290 | 1598 |
| Comp. 1 | 330 | 330, 340 | 103 | 86 | 1.2 | 330 | 593 |
| Comp. 2 | 325 | 330, 335, 345 | 6 | 5 | 1.2 | 330 | 349 |
| Comp. 3 | 283 | 280, 290, 300 | 68 | 53 | 1.3 | 290 | 1307 |
| Comp. 4 | 283 | 280, 290, 300 | 68 | 53 | 1.3 | 290 | 1307 |
| Comp. 5 | 283 | 285, 290 | 99 | 68 | 1.5 | 290 | 1062 |

TABLE 7

| | Infl. Mold. Conditions | | | Film Physical properties ([ ]: Relative Deviation (%)) | | | | | | | |
|---|---|---|---|---|---|---|---|---|---|---|---|
| | Die Temp. (° C.) | B1 Ratio | Dr Ratio | Tensile Strength (Mpa) | | | Elongation (%) | | | SOR | Film Thick. (μm) |
| | | | | T1 | T2 | T1/T2 | E1 | E2 | E1/E2 | | |
| Exmpl. 1 | 275 | 4.7 | 2.1 | 387 [4] | 330 [4] | 1.2 | 13 [7] | 11 [6] | 1.2 | 1.03 [2] | 50 [4] |
| Exmpl. 2 | 305 | 6.2 | 1.6 | 350 [4] | 310 [3] | 1.1 | 9 [5] | 8 [5] | 1.1 | 1.02 [2] | 25 [4] |
| Exmpl. 3 | 300 | 5.7 | 1.8 | 180 [5] | 160 [5] | 1.1 | 10 [6] | 9 [7] | 1.1 | 1.03 [3] | 50 [5] |
| Exmpl. 4 | 260 | 4.5 | 2.2 | 210 [7] | 117 [7] | 1.8 | 19 [6] | 10 [8] | 1.9 | 1.13 [4] | 100 [6] |
| Exmpl. 5 | 275 | 4.7 | 2.1 | 540 [5] | 300 [4] | 1.8 | 16 [5] | 14 [6] | 1.1 | 1.11 [3] | 50 [6] |
| Comp. 1 | 300 | 2.2 | 4.5 | 270 [10] | 55 [11] | 4.9 | 29 [9] | 6 [10] | 4.8 | 1.53 [8] | 50 [11] |
| Comp. 2 | 290 | Unable to form Film | | | | Unable to form Film | | | | | |
| Comp. 3 | 228 | Unsuccessful Inflation Mold | | | | Unsuccessful Inflation Molding | | | | | |
| Comp. 4 | 285 | Unable to form Film | | | | Unable to form Film | | | | | |
| Comp. 5 | 275 | 4.7 | 2.1 | 376 [11] | 342 [10] | 1.1 | 13 [12] | 12 [11] | 1.1 | 1.03 [11] | 50 [10] |

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from (Ea1/Ea2) of the activation energy Ea1 relative to the activation energy Ea2 being within the range of 1 to 1.7; said activation energies being measured by a capillary rheometer, including a nozzle of 1 mm in inner diameter and 10 mm in length disposed at an angle of introduction of 90° and a barrel of 9.55 mm in inner diameter, at respective shear rates of 243 seconds$^{-1}$ and 2432 seconds$^{-1}$ (the activation energy measured at the shear rate of 243 seconds$^{-1}$ being referred to as Ea1 while the activation energy measured at the shear rate of 2,432 seconds$^{-1}$ is referred to as Ea2) under a temperature ranging from a first temperature [(Tm−10)° C.], which is lower by 10° C. than the melting point [(Tm)° C.] of the thermotropic liquid crystal polymer, to a second temperature [(Tm+20)° C.], which is higher by 20° C. than the melting point [(Tm)° C.] of the thermotropic liquid crystal polymer;

said thermotropic liquid crystal polymer also having a melt viscosity, which, when measured at the shear rate of 2,432 seconds$^{-1}$ under a temperature ranging from the melting point [(Tm)° C.], of the thermotropic liquid crystal polymer to a third temperature [(Tm +10)° C.], which is higher by 10° C. than the melting point [(Tm)° C.] of the thermotropic liquid crystal polymer, is equal to or higher than 400 poises; and said extruding of the thermotropic liquid crystal polymer being carried out from a die that is heated to a die temperature [(Td)° C.] adjusted to satisfy the following equation:

$$0 \leq Tm - Td \leq 50$$

wherein Td represents the die temperature (° C.) and Tm represents the melting point (° C.) of the thermotropic liquid crystal polymer.

2. The method of manufacturing a film by inflation molding as claimed in claim 1, wherein the thermotropic liquid crystal polymer is at least one component of a multi-polymer composition.

3. A method for manufacturing a film by inflation molding comprising extruding a polymer composition comprising a thermotropic polymer capable of forming an optically anisotropic melt phase (hereinafter referred to as a thermotropic liquid crystal polymer), wherein said polymer composition having any one of activation energies Ea1c and Ea2c of a melt viscosity being within the range of 30 to 90 kcal/mol, with the ratio (Ea1c/Ea2c) of the activation energy Ea1c relative to the activation energy Ea2c being within the range of 1 to 1.7;

said activation energies being measured by a capillary rheometer, including a nozzle of 1 mm in inner diameter and 10 mm in length disposed at an angle of introduction of 90° and a barrel of 9.55 mm in inner diameter, at respective shear rates of 243 seconds$^{-1}$ and 2432 seconds$^{-1}$ (the activation energy measured at the shear rate of 243 seconds$^{-1}$ being referred to as Ea1c while the activation energy measured at the shear rate of 2,432 seconds$^{-1}$ is referred to as Ea2c) under a temperature ranging from a first temperature [(Tmc−10)° C.], which is lower by 10° C. than the melting point [(Tmc)° C.]of the polymer composition, to a second temperature [(Tmc+20)° C.], which is higher by 20° C. than the melting point [(Tmc)° C.]of the polymer composition;

said polymer composition also having a melt viscosity, which, when measured at the shear rate of 2,432 seconds$^{-1}$ under a temperature ranging from the melting point [(Tmc)° C.], which is the melting point of the polymer composition to a third temperature [(Tmc +10)° C.], which is higher by 10° C. than the melting point [(Tmc)° C.] of the polymer composition, is equal to or higher than 400 poises; and said extruding of the polymer composition being carried out from a die that is heated to a die temperature [(Td)° C.] adjusted to satisfy the following equation:

$$0 \leq Tm - Td \leq 50$$

wherein Td represents the die temperature (° C.) and Tm represents the melting point (° C.) of the thermotropic liquid crystal polymer.

4. The method of manufacturing a film as claimed in claim 1, wherein the inflation molding is performed with a blow ratio being within the range of 1.5 to 10 and a draft ratio being within the range of 1.5 to 20.

5. The method of manufacturing a film as claimed in claim 3, wherein the inflation molding is performed with a blow ratio being within the range of 1.5 to 10 and a draft ratio being within the range of 1.5 to 20.

* * * * *